United States Patent [19]
Toomey et al.

[11] Patent Number: 5,205,048
[45] Date of Patent: Apr. 27, 1993

[54] PIPELINE BEND DETECTOR PIG

[75] Inventors: Danny D. Toomey, Broken Arrow; Gene R. Ralls, Tulsa; Johnny M. Manley, Owasso, all of Okla.

[73] Assignee: TDW Delaware, Inc., Tulsa, Okla.

[21] Appl. No.: 796,065

[22] Filed: Nov. 20, 1991

[51] Int. Cl.5 .............................................. G01B 5/20
[52] U.S. Cl. ................................. 33/544; 33/544.3; 33/544.5
[58] Field of Search ................ 33/543.1, 544, 544.5, 33/544.3

[56] References Cited

U.S. PATENT DOCUMENTS

| | | | |
|---|---|---|---|
| 3,755,908 | 9/1973 | Vernooy | 33/178 |
| 3,821,856 | 7/1974 | Rapp | 33/544 |
| 3,882,606 | 5/1975 | Kaenel et al. | 33/544 |
| 3,886,665 | 6/1975 | Lowen | 33/544 |
| 3,991,745 | 11/1976 | Yoslow et al. | 33/512 |
| 4,247,985 | 2/1981 | Boyle | 33/544.3 |
| 4,251,921 | 2/1981 | Fink | 33/544.3 |
| 4,570,354 | 2/1986 | Hindes | 33/534 |
| 4,628,613 | 12/1986 | Laymon et al. | 33/544 |
| 4,715,128 | 12/1987 | Cummings | 33/544 |
| 4,780,962 | 11/1988 | Smith | 33/523 |
| 4,910,877 | 3/1990 | Sokol | 33/544 |
| 4,930,223 | 6/1990 | Smith | 33/302 |
| 4,953,412 | 9/1990 | Rosenberg et al. | 33/544 |

Primary Examiner—Thomas B. Will
Attorney, Agent, or Firm—Head & Johnson

[57] ABSTRACT

A pipeline bend detector pig for measuring a bend in pipeline is disclosed, the pig having an elongated flexible body for transposition through the pipeline. The body has an imaginary central axis that substantially remains coaxial with the pipeline cylindrical axis as the body transverses the interior of the pipeline. First and second length-measuring cables are supported to the body, each in a radial plane of and spaced from the body central axis and spaced angularly from each other. Each length-measuring cable has one end affixed to the body and a free end. Each cable has spring tension applied to the free end thereof to keep the cable taunt. A variable electrical resistance element is actuated by the free end of each cable as the free ends of the cables are moved by bends in the pipeline. An odometer for measuring the distance of travel of the pig is provided. A solid state memory records the distance traveled and the occurrence of bends in the pipeline.

23 Claims, 4 Drawing Sheets

PIPELINE BEND DETECTOR PIG

BACKGROUND OF THE DISCLOSURE

Pipeline operators are frequently required to know the location and degree of bends in pipelines. While construction engineering drawings frequently include information as to bends, operators from time to time need to know if changes in a pipeline have occurred, such as can be caused by shifts in the earth due to earth quakes or erosion or by physical contact of the pipeline. Where pipelines lie on the bottom of a river, lake, or ocean channel, the pipelines can be engaged by ship anchors to cause displacement of the pipeline. For these and a variety of other reasons, it is important for pipeline operators to periodically verify the existence of bends in a pipeline. "Bends" refer to changes in direction of a pipeline. Other types of pigs are employed for determining other pipeline characteristics, such as dents in the pipeline wall, constrictions, sidewall openings such as a branch fitting, the occurrence of valves or other apparatuses, and the existence of corrosion. The present disclosure, however, is directed toward a type of pipeline pig specifically intended to provide a record indicating changes in the direction, or bend, in a pipeline.

Pipeline pigs for determining deviations in the interior wall of a pipeline are known as caliper pigs. U.S. Pat. No. 3,755,908 entitled "Pipeline Pig", issued Sep. 4, 1973 is an example of a highly successful type of caliper pig.

Others have suggested bend detector apparatuses for use in pipelines. As an example, U.S. Pat. No. 4,780,962 filed Dec. 5, 1983 and entitled "Pipeline Bend Verification Pig" is an example of one type of apparatus for providing a record of bends in a pipeline.

U.S. Pat. No. 4,930,223 issued Jun. 5, 1990, entitled "Bend Detector Pig" is another example of a type of apparatus usable for indicating changes in a pipeline.

U.S. Pat. No. 4,628,613 entitled "Bend Detector For a Pipeline Pig" issued Dec. 6, 1986 is an additional example of a type of bend detector pig.

These references are indicative of the state of the art of pigs for determining changes in the direction of a pipeline. The present disclosure is an improved pipeline bend detector pig which, unlike other apparatuses of the type illustrated in these prior issued patents, does not require essentially two pig structures coupled together by hinge action or other complicated mechanical apparatus. Instead, the improved bend detector pig of this disclosure is a device in which the occurrence of a bend causes variable resistance elements to be actuated to provide electrical signals that are readily recorded for indicating the occurrence of a bend.

SUMMARY OF THE INVENTION

This disclosure provides an apparatus for measuring a bend in a length of cylindrical pipe having a cylindrical axis. To effect a measurement of a bend in the pipe, a pipeline bend detector pig is employed. At least a portion of the pig is configured to respond to a bend in the pipeline and to provide electrical signs that are then recorded for subsequent display and analysis as a means of indicating to a pipeline operator the location and degree of a bend in a pipeline.

The bend detecting portion of the pipeline apparatus is in the form of an elongated flexible body for transmission through the pipeline. The body has a first and second end and an external cylindrical surface slidably receivable in and closely conforming to the cylindrical pipeline internal surface. The body has an imaginary central axis that remains substantially coaxial with the pipe cylindrical axis as the body traverses the interior of the pipeline.

A first length-measuring element in the form of a length of cable is carried in the body in a first radial plane of the body central axis. This first length-measuring cable is spaced from the body central axis. The cable is affixed to the body at its rearward end, the forward end of the cable being under spring tension and free to move in response to deflection of the body as it traverses a bend in a pipeline. A second length-measuring element in the form of a second cable is, in like manner, supported by the flexible body in a second radial plane. The cable second end is under tension and is free to move relative to the body in response to the transposition of the body through a pipeline bend.

The second ends of each of the cables are attached to a device for converting movement thereof to changing electrical resistance. In the preferred arrangement, a potentiometer is provided for each cable. A cylindrical spool is attached to the shaft of a potentiometer. The spool has a length of constant force spring, such as a leaf spring, wound thereon, one end of the spring being attached for movement by the free end of the cable. The shaft of the potentiometer is rotated in response to movement of the cable free end which, in turn, moves in response to the occurrence of a bend in a pipeline as the flexible body moves through the pipeline.

The bend detector pig has an odometer that measures travel through a pipeline. Instrumentation, preferably in the form including a solid state memory, provides a record of the location and the occurrence of bends as the pig moves through a pipeline. A means must be provided for causing movement of the pig through a pipeline. This is preferably accomplished by the use of flexible cups to create a pressure differential so that the flow of fluid, either liquid or gas, causes the bend detector pig to move through the pipeline.

A better understanding of the invention will be had by reference to the following description and claims, taken in conjunction with the attached drawings.

DESCRIPTION OF THE PREFERRED EMBODIMENT

Figure 1:
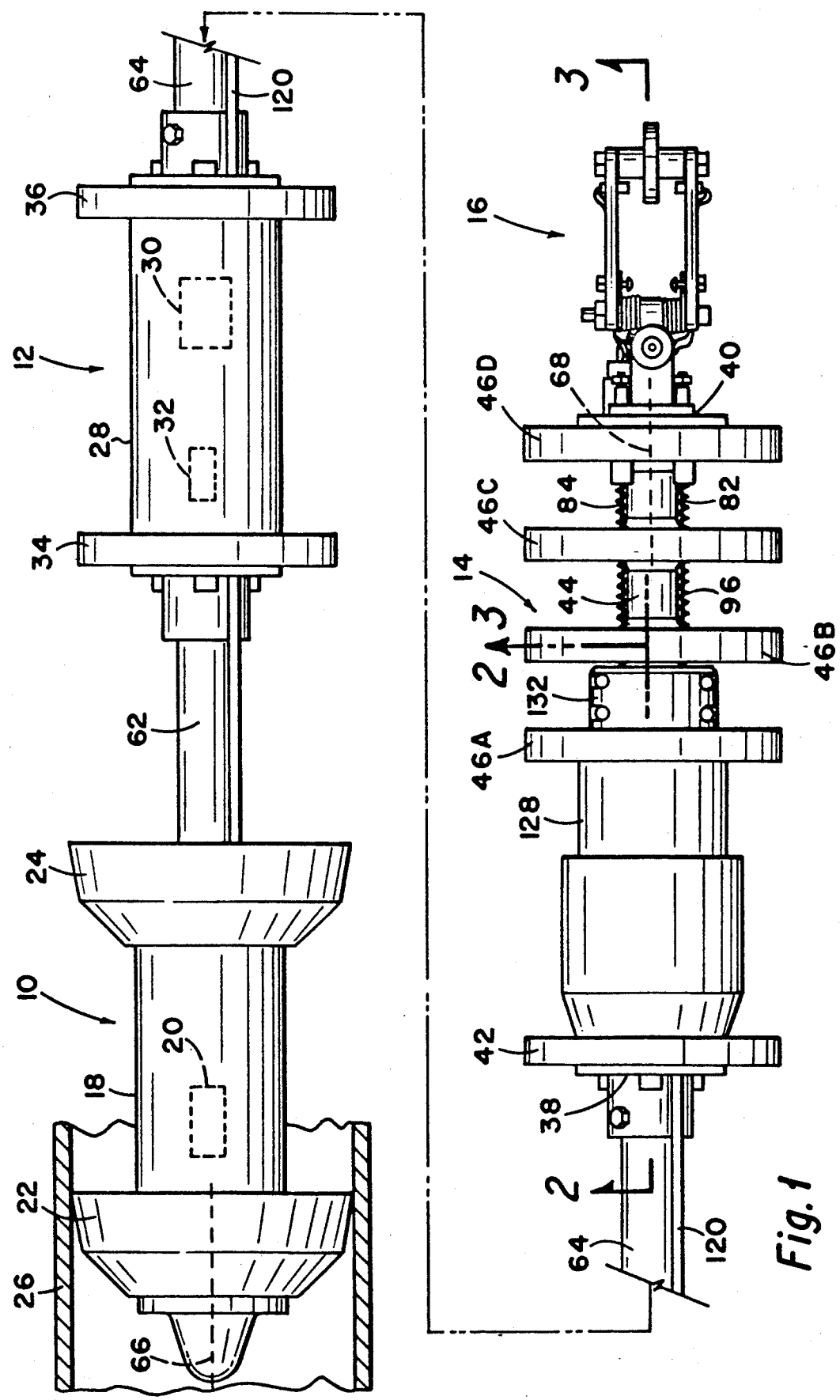
FIG. 1 is an external view of a pipeline bend detector pig in which the pig is in the form of four basic segments, the actual bend detecting portion of the pig being one of such segments.

Referring to the drawings and first to FIG. 1, the external configurations of a bend detector pig that employs the principles of this invention are illustrated. The bend detector pig as illustrated in FIG. 1 includes four basic sections, that is, a forward section 10, an instrument section 12, a bend detector section 14 and an odometer section 16.

The forward section 10 includes a housing 18 that may, by example, house batteries, generally indicated by the numeral 20. The batteries are utilized for powering the instrumentation in the pig as will be described subsequently. The forward section 10 also preferably includes cups 22 and 24 that flare outwardly for sliding engagement within the interior of the pipeline in which the pig is to be run, a segment of the pipeline being indicated by the numeral 26. The function of cups 22 and 24 are to impede the flow of fluid through pipeline 26 to produce differential pressure so as to propel the pig through the pipeline.

The instrument section 12 has a housing 28 that contains circuitry with memory for recording signals, the circuitry and memory means being indicated by the numeral 30. Instrument section 12 also preferably includes an azimuth detection instrument 32 that may be a commercially available device for indicating the orientation of the pig with respect to the vertical. Azimuth indicator 32 provides a signal for use in circuitry 30 as will be described subsequently.

Instrument section 12 includes elastomeric discs 34 and 36 of material such as urethane. Each disc 34 and 36 has an outer circumferential surface that closely contacts the interior of pipeline 26 to centrally support the instrument section as the pig travels through the pipeline.

As an alternate embodiment, not shown, forward section 10 may be eliminated and cups 22 and 24 installed on instrument section 12 in place of discs 34 and 36 to propel the pig. Coupling 62 (to be described subsequently) is removed and front piece 66 (also to be described subsequently) is placed on instrument section 12.

Bend detector section 14 includes the essential elements that are the subject of this disclosure and will be described in greater detail subsequently with reference to FIGS. 2 through 6. The bend detector section 14 has a forward end 38 and a rearward end 40. Adjacent to forward end 38 is an elastomeric disc 42 that supports bend detector section 14 centrally within the interior of pipeline 26, that is, the external circumferential surface of disc 42 closely conforms to the internal cylindrical surface of pipeline 26. Bend detector section 14 has an elongated flexible body 44 formed of plastic material, such as urethane, and the flexible body includes integral radial flange portions 46A, 46B, 46C and 46D that support flexible body 44 centrally within pipeline 26.

Figure 3:
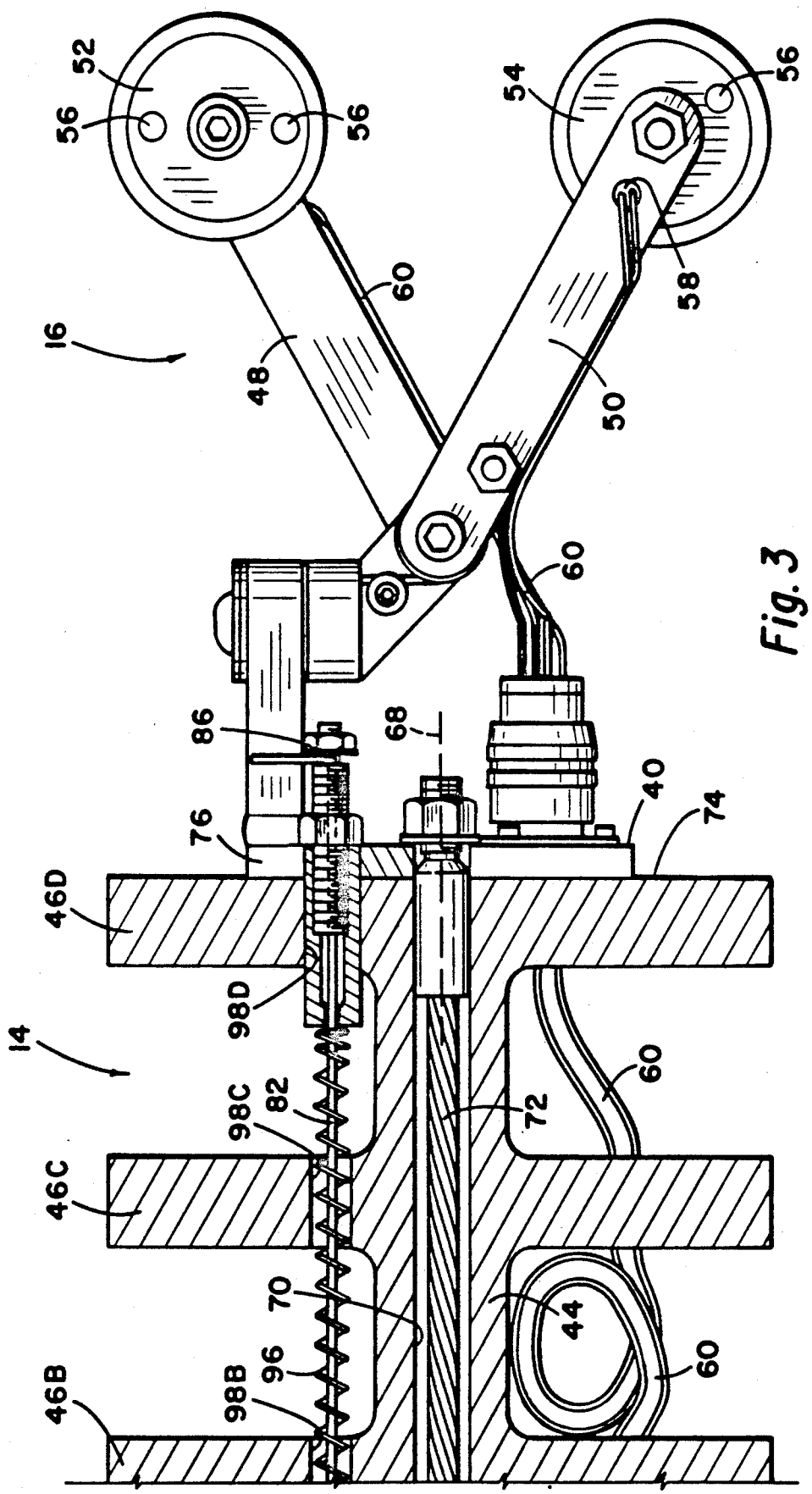
FIG. 3 is a cross-sectional view taken along the line 3—3 of FIG. 1 showing an enlarged cross-sectional view of the rearward portion of the bend detector portion of the pig.

The odometer section 16 includes means for measuring the travel of the pig through the interior of pipeline 26 using a technique illustrated best in FIG. 3. The odometer section has arms 48 and 50. At the outer end of arms 48 and 50 are odometer wheels 52 and 54. Each odometer wheel has magnets 56 that, as they rotate past a detector 58 (only the detector for arm 50 is shown), provide an electrical signal that is fed by cables 60 back to the circuitry within the instrument section. The basic configuration of odometer section 16 is well known in the industry. For more details about the function of odometer section 16, reference may be had to previously issued U.S. Pat. Nos. 3,732,625 and 3,862,497, each of which are incorporated herein by reference. Suffice it to say that the odometer section 16 measures the travel of the pig through a pipeline and provides a signal to instrument circuitry 30 (FIG. 1) for recording distance measurement on solid state memory in conjunction with the recording of bends as detected by the pig in the method to be described.

Referring back to FIG. 1, it can be seen that instrument section 12 is connected to forward section 10 by means of a flexible spool section 62 having a cable therein (not seen in FIG. 1). The spool 62 is preferably made of plastic and is tubular so as to allow free flexing between sections 10 and 12. In like manner, bend detector section 14 is coupled to instrument section 12 by a similar flexible spool 64. The cable is used to counteract tensile forces between sections. The spool only serves as a spacer.

Pipeline 26 has an imaginary central axis 68. The bend detector section flexible body 44, in like manner, has an imaginary central axis 68. The integral flanges 46A through 46D of the flexible body support central axis 68 substantially coincident with the pipeline central axis 68 as it moves through the pipe so that flexible body 44 takes the arcuate configuration of each arcuate section of the pipeline as the bend detector pig travels through it.

Figure 2:
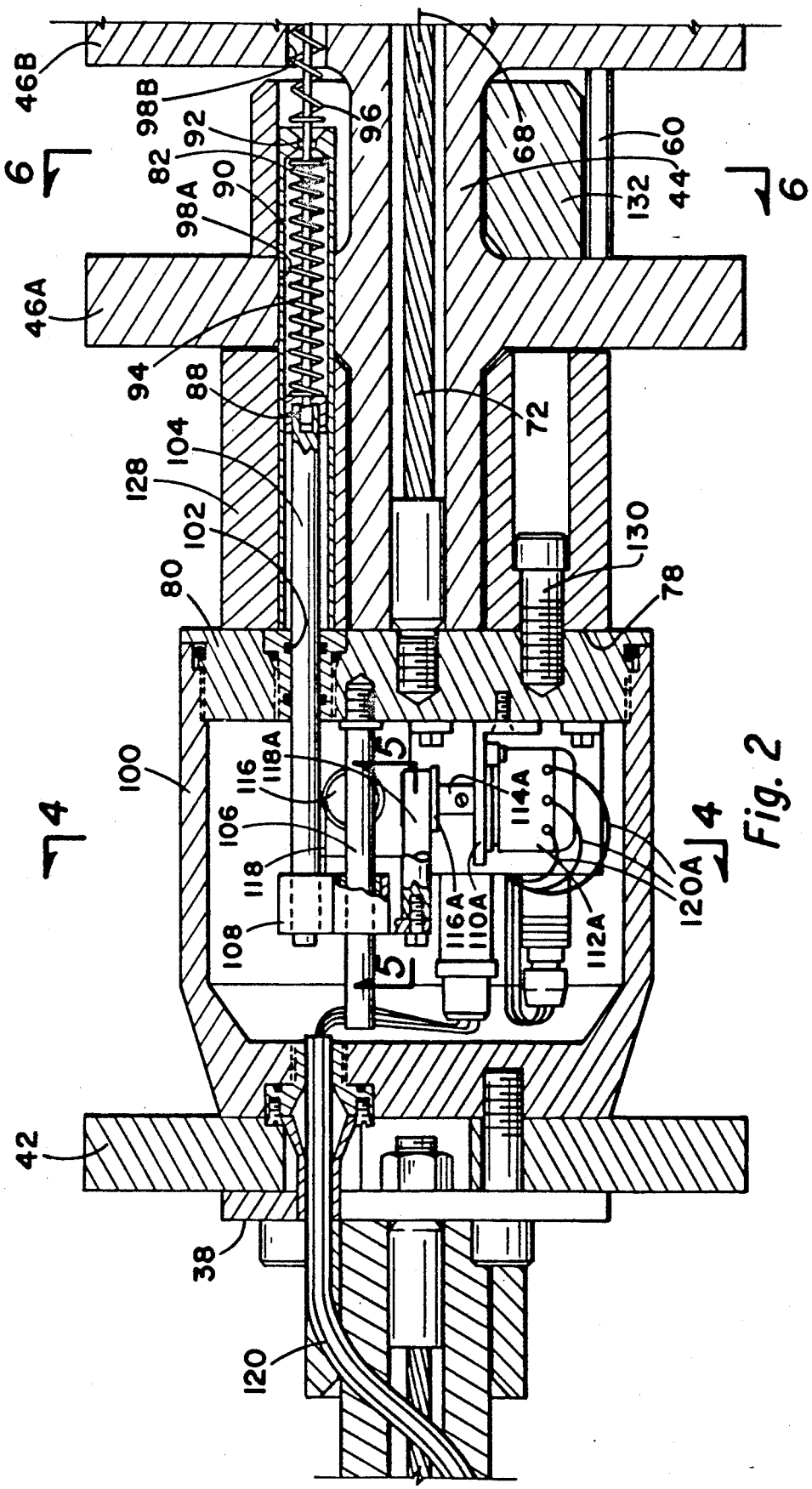
FIG. 2 is an enlarged cross-sectional view taken along the line 2—2 of FIG. 1 showing the forward section of the bend detector portion of the pig.

The essence of this disclosure is in the operation of the bend detector section 14 as revealed in detailed in the cross-sectional views of FIGS. 2 and 3. As seen in FIGS. 2 and 3, flexible body 44 is an integral member preferably formed of flexible plastic, such as urethane, the body having radial flange portions 46A through 46D. The body 44 is tubular, that is, it has a central opening 70 that receives a cable 72. The flexible body rearward end 74 is engaged by a plate 76 to which the rearward end of cable 72 is secured. At the forward end 78 of the flexible body 44, a plate 80 receives the forward end of cable 72. The function of cable 72 is to relieve flexible body 44 of tension as it moves through a pipeline and to pull with it odometer section 16 but, at the same time, to leave the flexible body free to flex in conformity with bends in the pipeline. Flexible body 44 has imaginary axis 68 as previously described. Bends occurring in the flexible body 44 are detected by two length-measuring cables 82 and 84. The cables 82 and 84 are arranged identically. Cable 84 is seen only in FIGS. 1 and 6. The details of construction and operation of cable 82 will be described, it being understood that cable 84 is of like arrangement.

As seen in FIG. 3, cable 82 has a rearward or first end 86. A forward or free end 88 is seen in FIG. 2. The cable rearward end is secured to plate 76, that is, it is fixed in reference to the flexible body rearward end 74. The forward end 88 of cable 82 is received in a tubular spacer element 90 that has a reduced diameter rearward end 92. By means of compression spring 94 held by spacer element 90 in the length measuring cable 82 is maintained under tension.

As seen in FIGS. 1, 2 and 3, a guide spring 96 surrounds cable 82. Guide spring 96 is for support purposes only, it is not in compression. Openings 98A through 98D are provided in flanges 46A through 46D respectively, the openings being spaced exteriorly of flexible body 44. These openings receive cable 82 and guide spring 96. Thus, cable 82 is supported in a plane of flexible body central axis 68 and is spaced from the central axis of the flexible body so that the free end 88 of the cable is displaced as body 44 is flexed when a bend in a pipeline is encountered.

Referring to FIG. 2 there is secured to plate 80 a housing 100 that contains within it a method of converting the movement of the free end 88 of cable 82 into an electrical signal. An opening 102 in plate 80 sealably and slidably receives a cylindrical cable shaft 104. The forward end 88 of cable 82 is attached to one end of cable shaft 104. Extending from plate 80 within housing 100 is a guide shaft 106. A guide block 108 slides on shaft 106, the guide block being secured to the forward end of cable shaft 104. Thus, the guide block moves on shaft 106 in response to the movement of free end 88 of cable 82 which, in turn, responds to bending of flexible body 44.

Figure 4:
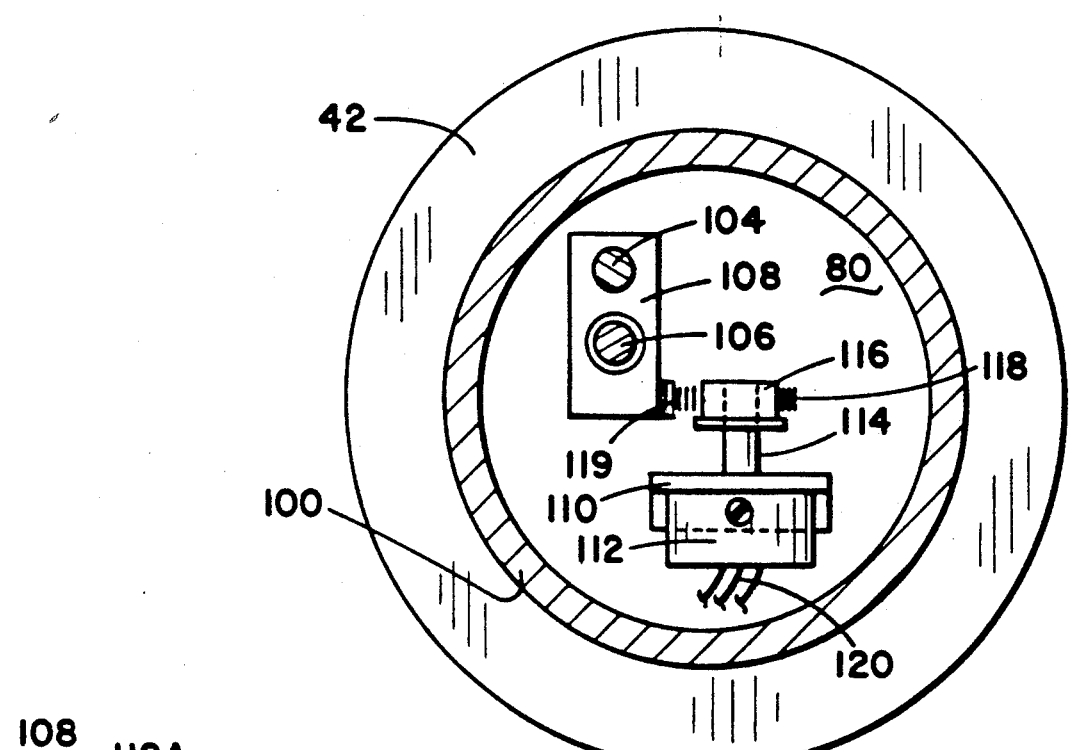
FIG. 4 is a cross-sectional view taken along the line 4—4 of FIG. 2 showing the means of converting the movement of the free end of a length-measuring cable to a variable resistance by the rotation of the shaft of a potentiometer as the free end of the cable moves in response to the occurrence to a bend in the pipeline.

By referring now to FIG. 4 the arrangement by which the movement of the free end of length-measuring cable 82 is converted into a variable resistance that is used in the generation of an electrical signal indicating a bend will be explained. As has been described, the movement of free end of cable 88 is coupled by cable shaft 104 to movement of guide block 108. As shown in FIG. 4, a bracket 110 secured by plate 80 supports potentiometer 112 having a rotatable shaft 114 extending therefrom. Affixed to shaft 114 is a spool 116. Coiled about spool 116 is a constant force spring 118, the coiled spring being shown in cross-section. The forward end 119 of the constant force spring is attached to guide block 108. As guide block 108 move longitudinally on guide shaft 106, constance force spring 118 is wound or unwound about spool 116, thereby rotating potentiometer shaft 114. This action provides a variable resistance output from the potentiometer that is fed by conductors 120 to the interior of instrument section housing 18 and specifically to circuitry 30. Thus, it can be seen that the movement of free end 88 of cable 82 is translated into rotation of potentiometer shaft 114 to provide a variable resistance that is utilized as a signal generating element for providing a signal for circuitry 30.

Refer now back to FIG. 2. In this view the cable shaft, guide shaft and guide block associated with the second length-measuring cable are not seen, but bracket 110A, potentiometer 112A, shaft 114A, spool 116A, constant force spring 118A and conductors 120A that are associated with it are seen. In actual arrangement these elements would also appear in FIG. 4 but are not shown to avoid crowding and since they are duplicative of the elements 104 through 120 that are shown.

Conductors 60, extending from odometer section 16 as seen in FIG. 3, pass to circuitry 30 within housing 18 so that the signals are received and recorded to indicate distance of travel and thereby location of the bend detector pig, as well as the occurrence of a bend as reflected by the signal generated as a result of the change of resistance of potentiometers 112 and 112A.

Figure 6:
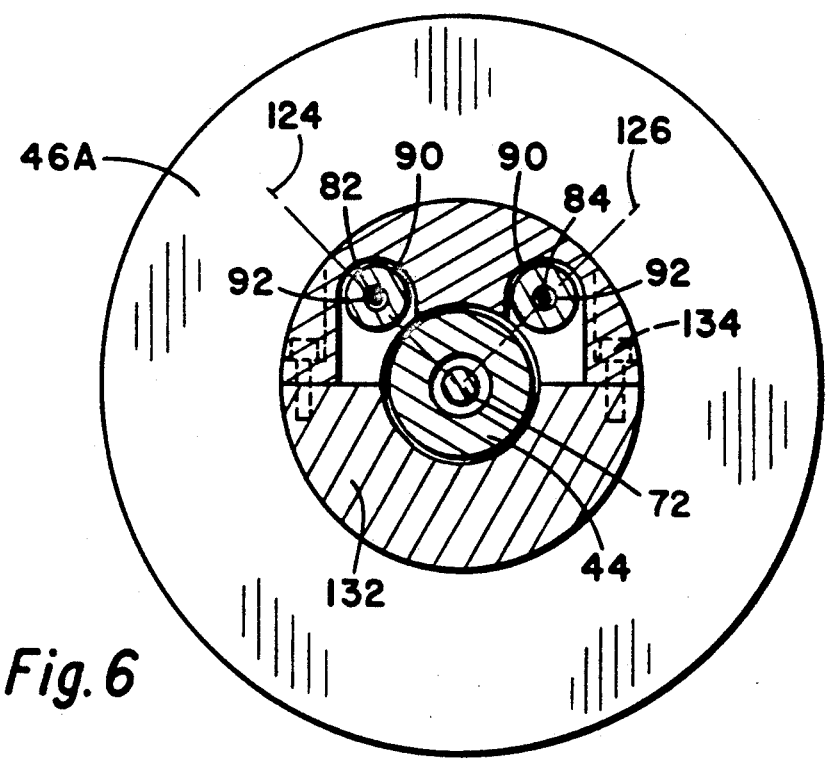
FIG. 6 is a cross-sectional view taken along the line 6—6 of FIG. 2 showing a cable support body clamp and the flexible body in cross-section.

As seen in FIG. 6, cable 82 is in one radial plane 124 taken through the imaginary central axis 68 of flexible body 44. The second cable 84 is in a second radial plane 126 that is displaced from plane 124 preferably at least 90 degrees. Each of cables 82 and 84 actuate a different potentiometer providing different electrical resistance measurements to circuitry 30. By the placement of the cables in planes 124 and 126 that are at least 90 degrees apart, the effect of a bend detected by the flexible body is converted into resistance measurements and thus into electrical signals so that the bend is detected regardless of the azimuth of the bend with respect to the bend detector pig.

As previously stated, the cross-sectional view of FIG. 4 illustrates only one potentiometer 112 as actuated by one guide block 108 sliding on one guide shaft 106 as actuated by one cable shaft 104. It is understood that FIG. 4 is representative only of the apparatus employed in conjunction with one of the length-measuring cables 82 and that in actual practice wherein two length-measuring cables are utilized that FIG. 4 would show duplicate elements for cable 84. Such duplicate elements are not shown as to avoid crowding and to make clarification of the concept of the disclosure easier to illustrate. Further, it is obvious that three, four or more length-measuring cables may be employed spaced in angular relationship to each other, each in a plane of the flexible body central axis 68 and each with a separate means of providing an electrical signal in response to movement of the free end of the cable as effected by a bend in the pipeline. The use of two cables as illustrated is the minimum requirement. As an example, if eight cables and eight potentiometers are employed, the cables would preferably be positioned 45 degrees apart.

Figure 5:
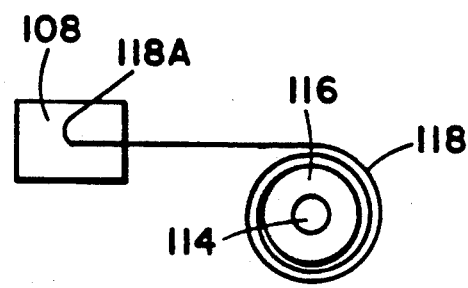
FIG. 5 is a fragmentary cross-sectional view taken along the line 5—5 of FIG. 2 showing details of a constant force spring wound about a spool affixed to the shaft of a potentiometer to cause rotation of the shaft as the constant force spring is wound and unwound about the spool in response to movement in the free end of a measurement cable.

As seen in the diagrammatic view of FIG. 5, constant force spring 118 can be placed around spool 116, as illustrated in FIG. 5, without requiring direct attachment of the spring to spool 116. That is, the tension of the coil spring winds itself to the external circumferential surface of spool 116 to rotate potentiometer shaft 114 as the spring is wound and unwound on the spool. Various means may be employed for affixing the free end 118A of the spring to the guide block 108.

As shown in FIGS. 1 and 2 an adapter block 128 is secured to the rearward face of plate 80 to structurally support the forward end portion of flexible body 44 so as to guide the free end 88 of cable 82 and, in like manner, to guide the free end of cable 84. The adapter block 128 is secured to plate 80 by means of bolt 130 as seen in FIG. 2.

A body clamp 132, as seen in FIGS. 1, 2 and 6, is secured about flexible body 44 between integral flange portions 46A and 46B. The body clamp is in two sections held together by bolts 134 and provide guides for spacer elements 90 that are coiled about length-measuring cables 82 and 84.

The length of flexible body 44 may vary considerably. Obviously, the longer the length, the more critically the bend detector pig will respond to the slight bends in the pipeline.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for measuring a bend in a length of cylindrical pipe having a cylindrical axis, comprising:
    an elongated flexible body for transposition through the length of cylindrical pipe having a first and a second end, said flexible body having a central substantially cylindrical core portion and a plurality of spaced apart radial integral enlarged diameter disc portions, the external cylindrical surface of said disc portions forming a body external cylindrical surface slidably received in and closely conforming to the cylindrical pipe internal surface, said flexible body having an imaginary central axis that substantially remains coaxial with the pipe cylindrical axis as the body traverses the interior of the pipe, said flexible body central core and said integral disc portions being formed of flexible plastic, said body substantially cylindrical with said body central opening therein at least substantially coincident with said body central axis and including a reinforcing cable received in said body central opening and secured to said body first and second ends;
    a first length-measuring means carried by said body in a first radial plane of said body central axis and spaced from said body central axis;
    a second length-measuring means carried by said body in a second radial plane having said body central axis therein, the second length-measuring means being spaced from and substantially parallel said body central axis, the second radial plane being angularly spaced from said first radial plane; the first and second length-measuring means responding to bending of said flexible body as it traverses the interior of a pipeline having at least one bend therein;
    means of converting length as measured by said first and second length-measuring means to bend signals;
    means for providing a distance signal indicating the distance travelled by said flexible body;
    means providing a record of said bend signals and said distance signals; and
    means to move said body through a length of cylindrical pipe.

2. An apparatus for measuring a bend in length of cylindrical pipe according to claim 1 wherein said first and second radial planes are angularly spaced apart at least about 90°.

3. An apparatus for measuring a bend in a length of cylindrical pipe according to claim 1 wherein each of said length-measuring means is in the form of a cable having one end affixed to said body adjacent said first end and a free end adjacent to said body second end; and
    transducer means supported to said body adjacent said second end receiving said free end of said cable and for converting the displacement of the cable free end to said bend signal.

4. An apparatus for measuring a bend in a length of cylindrical pipe according to claim 3 wherein said transducer means is in the form of a variable resistance means.

5. An apparatus for measuring a bend in a length of cylindrical pipe according to claim 4 wherein said variable resistance means is in the form of a potentiometer having a rotatable shaft extending therefrom; and
    means to rotate said shaft in response to the displacement of said cable free end.

6. An apparatus for measuring a bend in a length of cylindrical pipe according to claim 5 including:
    a spool received on said potentiometer shaft;
    a spring member in part coiled around said spool and having a free end; and
    means of affixing said spring free end to said cable free end.

7. An apparatus for measuring a bend in a length of cylindrical pipe according to claim 3 including:
    a spring member for each said cable arranged to maintain each said cable in tension.

8. An apparatus for measuring a bend in a length of cylindrical pipe according to claim 1 wherein said disc portions having aligned openings therein exterior of said core portion and wherein each said length measuring means includes a cable received in said aligned openings.

9. An apparatus for measuring a bend in a length of cylindrical pipe according to claim 1 wherein said apparatus has means for impeding flow of fluid therepast to produce a pressure differential to move said body through a length of pipe.

10. An apparatus for measuring a bend in a length of cylindrical pipe according to claim 1 having a plurality of connected segments connected together by central flexible spool sections, one of such segments comprising said elongated flexible body.

11. An apparatus for measuring a bend in a length of cylindrical pipe according to claim 10 wherein each of said segments has at least a portion thereof of external diameter substantially conforming to the internal cylindrical surface of the pipe in which a bend is to be measured.

12. An apparatus for measuring a bend in a length of cylindrical pipe according to claim 11 in which at least one said segment contains circuit means for providing said record of said bend signals and said distance signals.

13. An apparatus for measuring a bend in a length of cylindrical pipe according to claim 1 including:
    means providing an azimuth signal indicating orientation relative to the vertical of said flexible body; and
    means of conveying said azimuth signal indicating orientation relative to the vertical to said means providing a record of said bend signals whereby the azimuth direction of a detected bend is indicated.

14. An apparatus for measuring a bend in a length of cylindrical pipe having a cylindrical axis, comprising as at least a portion of such apparatus:
    an elongated flexible body for transposition through the length of cylindrical pipe having a first and a second end, and an external cylindrical surface slidably receivable in and closely conforming to the cylindrical pipe internal surface, the body having an imaginary central axis that substantially remains coaxial with the pipe cylindrical axis as the body traverses the interior of the cylindrical pipe;
    a first length-measuring cable carried by said body in a first radial plane of said body central axis and spaced from said body central axis, the first cable having one end affixed to said flexible body adjacent said first end and a free end adjacent said flexible body second end;

a second length-measuring means carried by said flexible body in a second radial plane having said body central axis therein, the second length-measuring means being spaced from and substantially parallel said body central axis, the second radial plane being angularly spaced from said first radial plane, the second cable having one end affixed to said flexible body adjacent said first end and a free end adjacent said body second end, the first and second length-measuring cables responding to bending of said flexible body as it traverses the interior of a pipeline having at least one bend therein by displacement of said cables free ends;

a first and a second potentiometer supported to said flexible body at said second end, each potentiometer having a rotatable shaft extending therefrom;

a spool received on each said potentiometer shaft;

a spring member coiled around each said spool and having a free end, the free end of said spring coiled around said spool on said shaft of said first potentiometer being affixed to said second end of said first length-measuring cable and the free end of said spring coiled around said spool on said shaft of said second potentiometer being affixed to said second end of said second length-measuring cable, whereby the displacement of said cables free ends are converted to bend measurement signals;

means for providing a distance signal indicating the distance travelled by said flexible body;

means providing a record of said bend signals and said distance signals; and means to move said flexible body through a length of pipe.

15. An apparatus for measuring a bend in length of cylindrical pipe according to claim 14 wherein said first and second radial planes are angularly spaced apart at least about 90°.

16. An apparatus for measuring a bend in a length of cylindrical pipe according to claim 14 including:

a cable spring member for each said spring cable arranged to maintain each said cable in tension.

17. An apparatus for measuring a bend in a length of cylindrical pipe according to claim 14 wherein said flexible body includes a central substantially cylindrical core portion and a plurality of spaced apart radial integral enlarged diameter disc portions, the external cylindrical surface of said disc portions forming said body external cylindrical surface slidably received in and closely conforming to the cylindrical pipe surface.

18. An apparatus for measuring a bend in a length of cylindrical pipe according to claim 17 wherein said flexible body central core and said integral disc portions are formed of flexible plastic, and wherein said body substantially cylindrical core portion has a central opening therein at least substantially coincident with said body central axis and including:

a reinforcing cable received in said body central opening and secured to said body first and second ends.

19. An apparatus for measuring a bend in a length of cylindrical pipe according to claim 14 wherein said apparatus has means for impeding flow of fluid therepast to produce a pressure differential to move said flexible body through a length of pipe.

20. An apparatus for measuring a bend in a length of cylindrical pipe according to claim 14 having a plurality of connected segments connected together by central flexible spool sections, one of said segments comprising said elongated flexible body.

21. An apparatus for measuring a bend in a length of cylindrical pipe according to claim 20 wherein each of said segments has at least a portion thereof of external diameter substantially conforming to the internal cylindrical surface of the pipe in which a bend is to be measured.

22. An apparatus for measuring a bend in a length of cylindrical pipe according to claim 21 in which at least one said segment contains circuit means for providing said record of said bend signals and said distance signals.

23. An apparatus for measuring a bend in a length of cylindrical pipe according to claim 14 including:

means providing an azimuth signal indicating orientation relative to the vertical of said flexible body; and means of conveying said azimuth signal indicating to orientation relative to the vertical to said means providing a record of said bend signals whereby the azimuth direction of a detected bend is indicated.

* * * * *